United States Patent Office 3,421,379
Patented Jan. 14, 1969

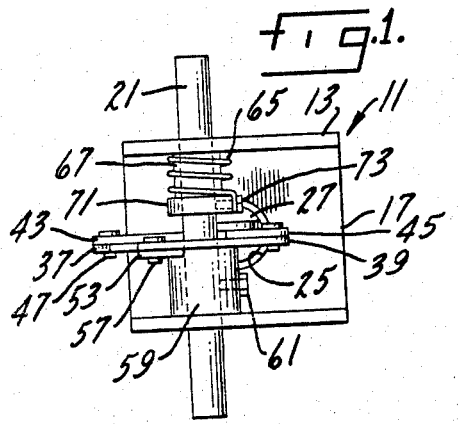
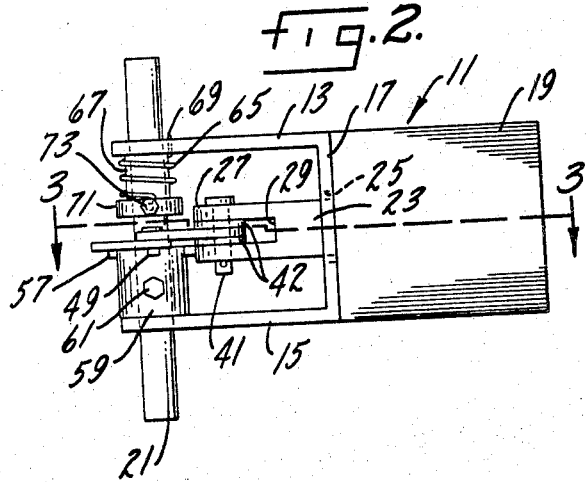
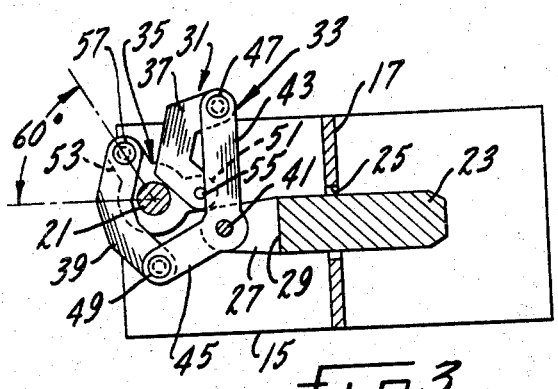
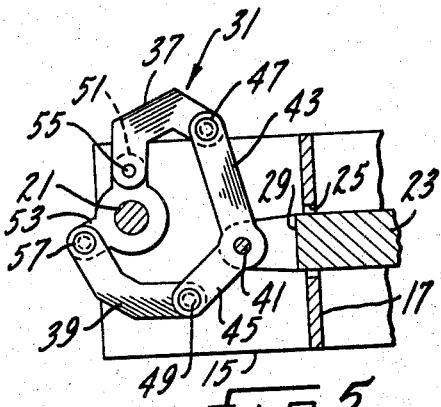
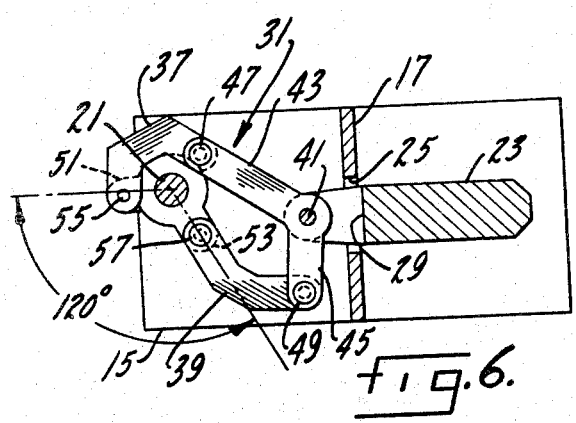
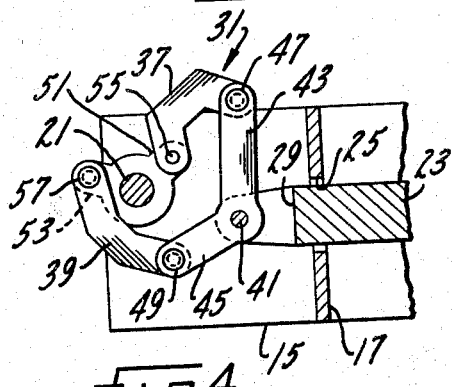
INVENTOR.
Robert P. Carroll,
BY Parker & Carter
Attorneys.

3,421,379
ROTARY-LINEAR CONVERTOR
Robert P. Carroll, Chicago, Ill.
(1315 E. Randolph Court, Milwaukee, Wis. 53212)
Filed Sept. 29, 1966, Ser. No. 582,950
U.S. Cl. 74—44    5 Claims
Int. Cl. F16h 21/34

ABSTRACT OF THE DISCLOSURE

A mechanism for converting linear motion into rotary motion and rotary motion into linear motion. This mechanism includes a support, a shaft rotatably mounted on the support, a plunger mounted for generally linear movement towards and away from the shaft and link means connecting the shaft and the plunger. The link means includes a plurality of link members which are pivotally connected together to form a foldable polygonal structure. Each link member is pivotally connected to two of the other link members. One of the link members is rigidly connected intermediate its ends to the shaft and another of the link members is pivotally connected intermediate its ends to the plunger. The link means rotate the shaft through an arc of approximately 180° upon linear movement of the plunger between first and second positions which are located at different distances from the shaft and also move the plunger between first and second positions upon rotation of the shaft through an arc of 180°. The link members are arranged so that the link member pivotally connected to the plunger does not pivot relative to the plunger during the first increments of movement of the plunger away from the shaft but commences to pivot about its pivotal connection with the plunger as the plunger continues to move along a generally linear path away from the shaft. A source of linearly applied power such as a solenoid may be connected to the plunger to move it along the generally linear path.

This invention is concerned with a mechanism for converting linear motion into rotational motion and more particularly with a mechanism for converting the linear motion of a solenoid plunger into rotational motion of a shaft.

An object of this invention is mechanism for converting a limited linear motion of a plunger into a shaft rotation of approximately 180°.

Another object is a mechanism for converting linear motion of a solenoid plunger into rotational motion of a shaft in which the torque required for rotation of the shaft is coordinated with the force developed by the solenoid plunger.

Another object is a mechanism in which the ratio of angular rotation of the shaft to linear travel of the plunger varies during travel of the solenoid plunger.

Another object is a mechanism in which the ratio of angular rotation of the shaft to linear travel of the plunger is smaller at the beginning of movement of the plunger than at the end of movement of the plunger.

Another object is a mechanism of the type described in which the torque required to rotate the shaft is small at the start of rotation of the shaft and increases as the angle of rotation of the shaft increases.

Another object is such a mechanism which is compact and simple in construction.

Other objects will be found in the following specification, claims and drawings.

The invention is illustrated more or less diagrammatically in the following drawings wherein:

FIGURE 1 is an end elevational view of a mechanism embodying the principles of this invention;

FIGURE 2 is a side elevational view of the mechanism of FIGURE 1;

FIGURE 3 is a view taken along line 3—3 of FIGURE 1;

FIGURE 4 is a partial view similar to FIGURE 3, but showing the shaft rotated from the position shown in FIGURE 3;

FIGURE 5 is a partial view similar to FIGURE 4, but showing the shaft rotated from the position shown in FIGURE 4; and FIGURE 6 is a view similar to FIGURE 3, but showing the shaft in its fully rotated position.

As seen in FIGURES 1, 2 and 3 in particular, the mechanism for converting a limited linear movement of a plunger into a large rotational movement of a shaft includes a U-shaped support 11 having spaced parallel walls 13 and 15 connected by an end wall 17. A solenoid housing 19 is attached to the side of the end wall 17 opposite to the walls 13 and 15. A shaft 21 is rotationally journalled in the walls 13 and 15 near the open end of the U-shaped support. A plunger 23 of a solenoid (not shown) extends through an opening 25 in the wall 17 and is mounted to reciprocate in a generally straight line at right angles to the axis of the shaft through the opening 25 upon energization and de-energization of the solenoid. The free end 27 of plunger 23, which extends outwardly of the solenoid housing 19, is slotted at 29.

A link means 31 connects the shaft 21 and the plunger 23. This link means includes a V-shaped member 33 which is pivotally connected adjacent its vertex to the plunger 23 at the free end 27 thereof, a V-shaped member 35 which is rigidly attached adjacent its vertex to the shaft 21 for rotation therewith, and link connectors 37 and 39 which are pivotally connected at their opposite ends to the ends of members 33 and 35. The member 33 is pivotally connected at its vertex to the plunger 23 by a pin 41 which extends through the slot 29 of the plunger. Washers 42 may be provided, as shown in FIGURE 2, to properly center the member 33 in the slot. The V-shaped member 33, in this embodiment, is formed with an included angle of approximately 120° between its arms 43 and 45. Also, the arm 43 is longer than the arm 45. Arm 43 is connected to link connector 37 by pivot pin 47 and arm 45 is connected to link connector 39 by pivot pin 49.

V-shaped member 35 is formed with an included angle of approximately 115° between its arms 51 and 53 and these arms, respectively, are connected to link connector 37 by a pivot pin 55 and to link connector 39 by a pivot pin 57. It should be noted that, in the embodiment shown in the drawings, the arms 51 and 53 of the member 35 are much shorter than the arms 43 and 45 of the member 33, with the arm 43 being longer than the arm 45 and the arm 53 being generally equal in length to the arm 51. It should be understood that the relative lengths of arms 43 and 45 and 51 and 53 may vary without departing from the teachings of this invention. The member 35 is formed with an integral sleeve 59 which telescopes over shaft 21 and is secured thereto by a fastener 61 so that the member 35 rotates with the shaft 21.

The link connectors 37 and 39 are shown as somewhat U-shaped to permit the connectors to fold closely to the shaft 21 as shown in FIGURES 3 and 6. However, it should be understood that these connectors may be formed in other shapes, such as arcuate or straight, so long as the linear spacing between the pivoted connections with the members 33 and 35 remain the same.

A torsion spring 65 is mounted over a sleeve 67 on shaft 21 with one end of the spring secured to the wall 13 at 69 and the other end thereof secured to a collar 71 which fits over and is secured to the shaft 21 by means of a fastener such as set screw 73. The spring is biased to return the shaft and link mechanism from the position of FIGURE 6 to the position of FIGURE 3 upon de-energization of the solenoid.

It should be noted that in this mechanism the plunger 23 is positioned so that its linear path of travel does not intersect the axis of the shaft 21, but rather is offset from this axis, for example as in FIGURE 3 where the linear path of the plunger is located below the axis of the shaft. Offsetting of the line of travel of the plunger to the axis of the shaft is not essential to the practice of this invention but permits a more compact arrangement of the link means when the mechanism is in the position of FIGURE 3 and also permits a somewhat greater maximum rotation of shaft 21.

The use, operation and function of the invention are as follows:

The linear motion to rotational motion converting mechanism of this invention rotates the shaft 21 from the position shown in FIGURE 3 through the positions of FIGURES 4 and 5 to the position of FIGURE 6 upon movement of the plunger 23 due to actuation of the solenoid (not shown). In the position of the mechanism shown in FIGURE 3, the solenoid is not energized and the plunger 23 is in its position of closest approach to the shaft 21. The arm 43 of member 33 extends generally at right angles to the longitudinal axis of the plunger 23 and the opposite arm 45 of this member is inclined relative to said longitudinal axis and points generally in the direction of the shaft 21. The arm 51 of member 35 points in the direction of the plunger 23 and extends generally parallel to the longitudinal axis of the plunger while the arm 53 of this member points away from the plunger and is inclined relative to the longitudinal axis thereof. Arm 53 forms an angle of approximately 60° with the longitudinal axis of the plunger, as indicated in FIGURE 3.

It should be noted that when the mechanism of this invention is in the position shown in FIGURE 3, the pivot pin 41 connecting the plunger 23 and its pivotally attached member 43 is in its closest position to the shaft 21. Also, the pivot pin 55 lies on the plunger side of a straight line between pivot pin 47 and the center of shaft 21. Additionally, a straight line connecting pivot pin 49 and pivot pin 57 lies on the side of shaft 21 located away from the plunger.

Upon actuation of the solenoid, the plunger 23 moves along a linear path to the right as viewed in FIGURE 3 and the V-shaped member 33 moves along with the plunger. During the first increments of movement of the plunger 23, arms 43 and 45 of member 33 maintain the same positions relative to the longitudinal axis of the plunger 23 as is seen in FIGURE 3. The relative positions of these arms do not begin to change until the pivot pin 55 passes through a straight line extending between the center of the shaft 21 and the pivot pin 47. Pivot pin 55 moves into alignment with the center of the shaft 21 and pivot pin 47, i.e. the position shown in FIGURE 4, after shaft 21 has been rotated through an angle of approximately 35°. During this linear movement of member 33, arm 45 by pulling through link connector 39 will rotate arm 53 of member 35 in a counter-clockwise direction as viewed in FIGURE 3. Also, arm 43 and arm 51 will be moving link connector 37 into the position of FIGURE 4 in which pivot pin 47 is located at its maximum distance from shaft 21. This distance is equal to the sum of the length of arm 51 and the effective length of link connector 37. The length of arm 51 is the distance from the axial center of shaft 21 to the center of pivot pin 55 while the effective length of link 37 is the distance between pivot pin 47 and pivot pin 55.

After the pivot pin 55 has passed through the straight line between the center of shaft 21 and pivot pin 47 in a counter-clockwise direction as viewed in the drawings, the member 33 will begin to rotate in a counter-clockwise direction as viewed in the drawings upon continued movement of the plunger away from shaft 21. Upon such rotation of member 33, arm 43 will rotate towards the shaft 21 and arm 45 will rotate away from the shaft 21 as seen in FIGURE 5. The combined linear and rotational movement of the arms 43 and 45 will bring about increased degree of rotation of the member 35 for each increment of movement of the plunger 23 after the mechanism is in the position of FIGURE 4.

As the plunger 23 is drawn into the solenoid and away from the shaft 21, the member 33 will continue to move with the plunger and will also continue to rotate in a counter-clockwise direction as viewed in the drawings until the plunger reaches the position at the end of its travel as is shown in FIGURE 6. In the position of FIGURE 6, the shaft 21 will have been rotated through an angle of approximately 180°. Also, the link connector 39 will be positioned on the plunger side of the shaft 21 and the pivot pin 55 will be located on the opposite side of the shaft 21 and the pivot pin 55 will be located on the opposite side of the shaft from its position shown in FIGURE 3. Further, the pivot pin 47 will be in its position of closest approach to the shaft 21. Upon de-energization of the solenoid, the spring 67 will return the mechanism to the position shown in FIGURE 3.

In this mechanism, the ratio of angular rotation of the shaft 21 to linear movement of the plunger 23 is small during the first increments of linear movement of the plunger but increases during later increments of movement of the plunger. Until the pivot pin 55 moves to the position of FIGURE 4, where it is aligned with the center of the shaft 21 and pivot pin 47, there is very little angular rotation of the shaft 21 compared to the amount of movement of the plunger 23. However, once the pivot pin 55 moves across this straight line and past the position shown in FIGURE 4, the angular rotation of the shaft for each increment of linear movement of the plunger 23 increases. This is due to the fact that the member 33 does not rotate about its pivotal connection with the plunger until the pivotal connection 47 of its longer arm 43 reaches its maximum distance from the shaft 21. Before member 33 rotates, the turning effect on the shaft 21 is due primarily to the linear travel of the member 33. After the member rotates, both the rotation and the linear movement of the member cause rotation of the shaft 21. For example, solenoid plunger 23 moves approximately half of its linear travel into the solenoid before the pivot pin 55 reaches the position shown in FIGURE 4. During this movement of the plunger, the shaft 21 rotates approximately 35°, only one-sixth of the arc through which it rotates upon a complete movement of the plunger. Therefore, it can be seen tht the link means 31 applies the force produced during approximately one-half of the movement of the solenoid plunger to the first one-sixth of the rotation of the shaft 21. This is particularly advantageous since a greater amount of force is available at the start of rotation of the shaft to provide the torque needed to overcome the inertia of the shaft and its load. Also, it permits smaller solenoids to be used since the forces produced by a solenoid are smallest at the beginning of the plunger stroke where the greater force is needed to start rotation of the shaft.

Whereas, one embodiment of this invention has been shown and described it should be understood that this is only a preferred embodiment and that changes may be made in the structure without departing from the teachings of the invention. For example, in the preferred embodiment the plunger is moved by a solenoid. However, the plunger could also be moved by other means. Also, while this mechanism has been shown as adapted to convert linear motion into rotational motion, it could also be adapted to convert the rotational movement of a drive shaft into a linear motion. Therefore, the scope of the invention should be limited only by the scope of the hereinafter appended claims.

I claim:

1. A mechanism for converting linear motion into rotary motion and rotary motion into linear motion including:
- a support,
- a shaft rotatably mounted on said support,
- a plunger mounted for generally linear movement towards and away from said shaft, and
- link means connecting said shaft and said plunger with said link means including a plurality of link members pivotally connected together to form a foldable polygonal structure with each link member pivotally connected to two other of said link members,
- one of said link members being rigidly connected intermediate its ends to said shaft and another of said link members being pivotally connected intermediate its ends to said plunger,
- said link means adapted to rotate said shaft through an arc of approximately 180° upon generally linear movement of said plunger between first and second positions located at different distances from said shaft and to move said plunger between said first and said second positions upon rotation of said shaft through an arc of 180° with said link members arranged so that said link member pivotally connected to said plunger does not pivot relative to said plunger during the first increments of movement of said plunger away from said shaft but does commence to pivot about its pivotal connection with said plunger as said plunger continues to move along said generally linear path away from said shaft.

2. The structure of claim 1 further characterized in that said link member which is pivotally connected to said plunger commences pivoting about its pivotal connection with the plunger when one of its pivotal connections to a link member joining said plunger link member and the link member which is pivotally connected to said shaft reaches its point of maximum spacing from said shaft.

3. The structure of claim 1 further characterized in that the path of movement of said plunger is off-set from the axis of said shaft.

4. The structure of claim 1 further characterized in that said elongated shaft and plunger link members are each generally V-shaped with the vertex of the shaft link member being generally concentric with the axis of the shaft and the vertex of the plunger link member being located at its pivotal connection with the plunger.

5. The structure of claim 4 further characterized in that one arm of the V-shaped plunger link member is longer than the other arm with said longer arm extending generally at right angles to the axis of said plunger when said plunger is in its position of closest approach to said shaft, the pivotal connection between said arm and said link member joining said arm to said V-shaped shaft link member being adapted to move in a linear direction parallel to the path of said plunger during the first increments of movement of said plunger and then to reverse direction and move towards the shaft upon continued movement of said plunger away from said shaft, said reversal of direction taking place when said pivotal connection reaches its maximum distance from said shaft.

References Cited

UNITED STATES PATENTS

| 1,159,620 | 11/1915 | Terkelson | 74—44 |
| 2,330,047 | 9/1943 | Godsey | 74—99 |
| 2,619,133 | 11/1952 | Durand et al. | 74—45 |
| 2,775,800 | 1/1957 | Ellms | 74—89 |
| 3,111,851 | 11/1963 | Liesen | 74—99 |
| 3,134,266 | 5/1964 | Wallace | 74—44 |
| 3,226,988 | 1/1966 | Carnelli | 74—44 |

FRED C. MATTERN, JR., *Primary Examiner.*

W. S. RATLIFF, *Assistant Examiner.*

U.S. Cl. X.R.

74—89